US012222793B2

(12) United States Patent
Griffith et al.

(10) Patent No.: US 12,222,793 B2
(45) Date of Patent: Feb. 11, 2025

(54) DETECTING REDUNDANT POWER FEEDS

(71) Applicant: INTERNATIONAL BUSINESS MACHINES CORPORATION, Armonk, NY (US)

(72) Inventors: Douglas Griffith, Round Rock, TX (US); Eric Norman Lais, Georgetown, TX (US); Ashley Lim, Wellesley Hills, MA (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 18/187,961

(22) Filed: Mar. 22, 2023

(65) Prior Publication Data
US 2024/0319780 A1    Sep. 26, 2024

(51) Int. Cl.
G06F 1/00      (2006.01)
G06F 1/28      (2006.01)
G06F 1/3215    (2019.01)
G06F 1/3234    (2019.01)

(52) U.S. Cl.
CPC .............. G06F 1/3275 (2013.01); G06F 1/28 (2013.01); G06F 1/3215 (2013.01)

(58) Field of Classification Search
CPC ......... G06F 1/3275; G06F 1/28; G06F 1/3215
See application file for complete search history.

(56) References Cited

U.S. PATENT DOCUMENTS

| | | | |
|---|---|---|---|
| 4,915,639 A | 4/1990 | Cohn | |
| 5,349,644 A | 9/1994 | Massey | |
| 6,031,298 A * | 2/2000 | Lo | H02J 1/10 307/64 |
| 7,509,114 B2 | 3/2009 | Berson | |
| 7,877,622 B2 | 1/2011 | Gruendler | |
| 7,893,560 B2 | 2/2011 | Carter | |
| 7,986,058 B2 | 7/2011 | Draeger | |
| 10,554,257 B2 | 2/2020 | Hansell | |
| 11,462,910 B2 | 10/2022 | Lui | |

(Continued)

FOREIGN PATENT DOCUMENTS

| | | |
|---|---|---|
| CN | 201732336 U | 2/2011 |
| CN | 109462230 A | 3/2019 |

(Continued)

OTHER PUBLICATIONS amazon.com. NexusLink G.hn Powerline Ethernet Adapter <Retrieved from internet on Dec. 12, 2022.> 10 pgs.

*Primary Examiner* — Nitin C Patel
(74) *Attorney, Agent, or Firm* — Scott S. Dobson

(57) ABSTRACT

A computer system, computer readable storage medium, and computer-implemented method for detecting if one or more processing devices have separately sourced power feeds. The method includes determining transmission of a first signal in a first electric path. The method also includes monitoring for a second signal in a second electric path that is different from the first electric path. The method further includes determining, subject to the monitoring, electrical isolation between the first electric path and the second electric path. The claimed computer-implemented method dynamically, and automatically, determines that power sources are separate, isolated, and redundant.

17 Claims, 13 Drawing Sheets

(56) References Cited

U.S. PATENT DOCUMENTS

| | | | |
|---|---|---|---|
| 2004/0039536 A1* | 2/2004 | Garnett | G01R 31/40 |
| | | | 702/58 |
| 2009/0206669 A1 | 8/2009 | Draeger | |
| 2010/0066431 A1* | 3/2010 | Carter | H02J 9/061 |
| | | | 327/408 |
| 2019/0391626 A1 | 12/2019 | Wang | |
| 2022/0164015 A1* | 5/2022 | Pearson | G06F 11/2015 |

FOREIGN PATENT DOCUMENTS

| | | |
|---|---|---|
| CN | 110233478 B | 12/2020 |
| GB | 2568826 B | 6/2022 |

\* cited by examiner

DETECTING REDUNDANT POWER FEEDS

BACKGROUND

The present disclosure relates to power supplies to computer systems, and, more specifically, toward detecting if one or more processing devices have separately sourced power feeds.

Many known computer systems are positioned within data centers. These data centers receive electrical power from a variety of distribution branches that include multiple power lines, transformers, switchgear, circuit breakers, and power conditioners. The power conditioners are generally configured to receive the electric power from the respective electric power utility and convert it to electric power that meets the design specifications of the computer systems' processing devices, etc. Some of the data centers include one or more frames, where each frame defines a particular collection of servers. Some data centers include individual server cabinets that each include one or more racks that include the respective computing devices therein. In general, each frame and/or rack is typically scheduled to be electrically coupled to a plurality of redundant power conditioners, where each power conditioner receives its electrical power from a separate, redundant electric source. In the event of a loss of one power source, and associated de-energization of the associate power conditioner, the one or more redundant power conditioners powered from the remaining energized source remain in service.

SUMMARY

A system, medium, and method are provided for detecting if one or more processing devices have separately sourced power feeds.

In one aspect, a computer system for detecting if one or more processing devices have separately sourced power feeds is presented. The system includes one or more processing devices. The system also includes one or more memory devices communicatively and operably coupled to the one or more processing devices. The system further includes a power management tool communicatively and operably coupled to the one or more processing devices. The power management tool is configured to determine transmission of a first signal in a first electric path. The power management tool is also configured to monitor for a second signal in a second electric path that is different from the first electric path. The power management tool is further configured to determining, subject to the monitoring, electrical isolation between the first electric path and the second electric path. The claimed computer system dynamically, and automatically, determines that power sources are separate, isolated, and redundant.

In another aspect, a computer readable storage medium is presented. The computer readable storage medium includes computer executable instructions that when executed by at least one computing device detecting if one or more processing devices have separately sourced power feeds. The computer readable storage medium includes instructions to determine transmission of a first signal in a first electric path. The computer readable storage medium also includes instructions to monitor for a second signal in a second electric path that is different from the first electric path. The computer readable storage medium further includes instructions to determine, subject to the monitoring, electrical isolation between the first electric path and the second electric path. The claimed computer readable storage medium dynamically, and automatically, determines that power sources are separate, isolated, and redundant.

In yet another aspect, a computer-implemented method for detecting if one or more processing devices have separately sourced power feeds is presented. The method includes determining transmission of a first signal in a first electric path. The method also includes monitoring for a second signal in a second electric path that is different from the first electric path. The method further includes determining, subject to the monitoring, electrical isolation between the first electric path and the second electric path. The claimed computer-implemented method dynamically, and automatically, determines that power sources are separate, isolated, and redundant.

The present Summary is not intended to illustrate each aspect of every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
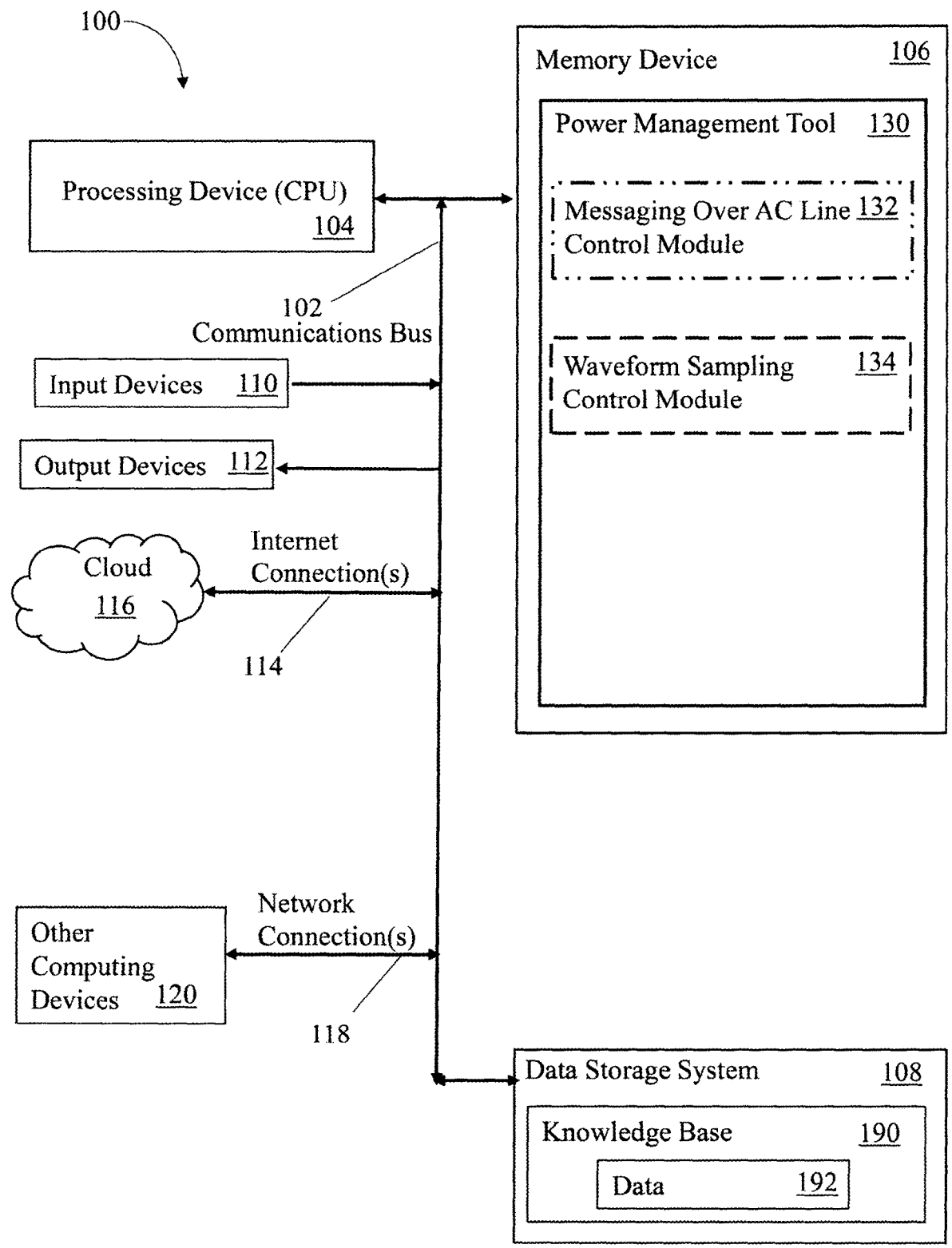
FIG. 1 is a block diagram illustrating a computer system configured to execute operations associated with detecting if one or more processing devices have separately sourced power feeds, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to implementing a system, medium, and method for detecting if one or more processing devices have separately sourced power feeds. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following detailed description of the embodiments of the apparatus, system, method, and computer readable storage medium of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As used herein, "facilitating" an action includes performing the action, making the action easier, helping to carry the action out, or causing the action to be performed. Thus, by way of example and not limitation, instructions executing on one processor might facilitate an action carried out by semiconductor processing equipment, by sending appropriate data or commands to cause or aid the action to be performed. Where an actor facilitates an action by other than performing the action, the action is nevertheless performed by some entity or combination of entities.

Many known computer systems are positioned within data centers. These data centers receive electrical power from a variety of distribution branches within an electric power supply system that include multiple power lines, transformers, switchgear, circuit breakers, and power conditioners. The power conditioners are generally configured to receive the electric power from the respective electric power utility and convert it to electric power that meets the design specifications of the computer systems' processing devices, etc. Some of the data centers include one or more frames, where each frame defines a particular collection of servers. Some data centers include individual server cabinets that each include one or more racks that include the respective computing devices therein. In general, each frame and/or rack is typically scheduled to be electrically coupled to a plurality of redundant power conditioners, where each power conditioner receives its electrical power from a separate, redundant electric source. In the event of a loss of one power source, and associated de-energization of the associated power conditioner, the one or more redundant power conditioners powered from the remaining energized source remain in service.

In some of these known data centers, at least some of the frames' and racks' power supply units receive their respective electric power feeds from the same power conditioner unit. In at least some other data centers, at least a portion of the redundant power conditioning units receive their power from a unitary electric power source, thereby effectively powering the respective processing devices from a non-redundant power source. In such conditions, the loss of either the single power conditioning unit or the loss of the unitary electric power supply, may result in an unexpected outage for the affected portions of the data center. In some instances, the root cause of the non-redundancies associated with the power feeds to the frames include relying on human oversight to verify that the respective alternating current (AC) cables are extending between redundant power supply components at commissioning of electric power supply system for the data center. In some instances, such unreliable human oversight may also result in not fully restoring the electric power supply system from previous maintenance activities that required de-energizing of any of the redundant electric power supply components. Not every data center has installed an expensive emergency power system to maintain all of the respective processing devices in a frame/rack in a fully operable condition.

Accordingly, an improvement to the known electric power supply systems for frames and racks to automatically verify, with little to no human interaction, that the respective frames and racks are in fact electrically coupled to redundant power supplies is needed.

Some known mechanisms to remediate the effects of an external network or an internal network fault incident that occurs in a regional electric power grid includes a rapid reconstruction method and system (see CN110233478B). The information for the post-fault configuration, i.e., present network state of the is collected and compared to a state table of potential fault mechanisms and their respective recovery actions. Once the fault is cleared, one or more network connection recovery circuit breakers (that are typically open for normal operation) are closed while the remainder of the system removed from service is automatically restored to its pre-fault status. Once the system is restored, the network connection recovery circuit breakers are opened.

Some known mechanisms for providing reliable electric power to devices in data centers with multiple power supplies includes identifications of electrical cable connections endpoints is the data centers (U.S. Pat. No. 7,986,058B2), includes, in the event of a failure of the power supply in service, an automatic switchover to the redundant power supply is executed. Similar switching mechanisms for switching between redundant power supplies are disclosed in U.S. Pat. No. 7,509,114B2.

Some known mechanisms for providing reliable electric power to devices in data centers with multiple power supplies includes identifications of electrical cable connections endpoints is the data centers (see GB2568826B). As disclosed, the mechanism for determining the state of an electric power distribution system for a rack of electronic devices includes detecting thermal signatures of the connections through analysis of infrared (IR) images manually taken of the rear of a rack. The IR images are ingested into a database through a computer program configured to process the images. The detected signatures are used for identifying electrical cable connections. The signatures may be altered through changing the configuration of the electrical cable connections through modulating the current flowing therethrough.

Some known mechanism for determining topological properties of an electrical distribution grid are disclosed (see U.S. Pat. No. 10,554,257B2). A low-power pilot signal is sent at a sufficiently low amplitude and high frequency through the respective power line such that the pilot signal will not be detectable on the electric power devices in the system. Various devices throughout the electrical distribution grid are used to receive the pilot signal and either return an acknowledgement message or a negative acknowledgement message such that the topology of the electrical distribution grid may be inferred through an inventory of electrical couplings within the electrical distribution grid.

In addition, those skilled in the art of electric power transmission and distribution telemetry are at least familiar with power line communications and carrier systems that have been in service for electric utilities in North America for the better part of the 20$^{th}$ Century, and is still in use in the 21$^{st}$ Century.

Referring to FIG. 1, a block diagram is presented illustrating a computer system, i.e., power supply management system 100 (herein referred to as "the system 100") that is configured to execute detecting if one or more processing devices have separately sourced power feeds, in accordance with some embodiments of the present disclosure. The system 100 includes one or more processing devices 104 (only one shown) communicatively and operably coupled to one or more memory devices 106 (only one shown) through a communications bus 102, and in some embodiments, through a memory bus (not shown). In some embodiments, the processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 8), e.g., and without limitation, the system 100 is a computer system/server that may be used as a portion of a cloud-based systems and communications environment through the cloud 116 and the Internet connections 114.

In one or more embodiments, a power management tool 130 (herein referred to as "the tool 130") is at least partially resident within the memory device 106. In some embodiments, the power management tool 130 is fully resident within the memory device 106. The tool 130 is discussed in detail further in this disclosure. The tool 130 is configured to execute the actions necessary for detecting if one or more processing devices have separately sourced power feeds, more specifically, to automatically execute one or more of a plurality of operations for determining if the redundancy of power supply continuity is sufficiently present. In some embodiments, the aforementioned processing devices include the one or more processing devices 104. In at least some embodiments, the tool 130 resident in the memory device 106 is configured to run continuously in the background to automatically execute the self-testing processes. In some embodiments, the tool 130 is directly engaged for specific tasking by the users thereof, e.g., and without limitation, manual execution commands.

In at least some embodiments, as shown in FIG. 1, the tool 130 includes the modules for the processes described herein. The tool 130 includes a messaging over AC line control module 132 that controls the injection of messaging pulse into the respective power lines. In addition, the tool 130 incudes a waveform sampling control module 134 that manages waveform analyses of power supply AC.

Further, in some embodiments, the data storage system 108 is configured to maintain a knowledge base 190 that includes any data 192 the tool 130 needs for proper redundancy verification execution. The data storage system 108 is also configured to store the data collected during the messaging and waveform analyses as executed by the modules 132 and 134, respectively.

Figure 2:
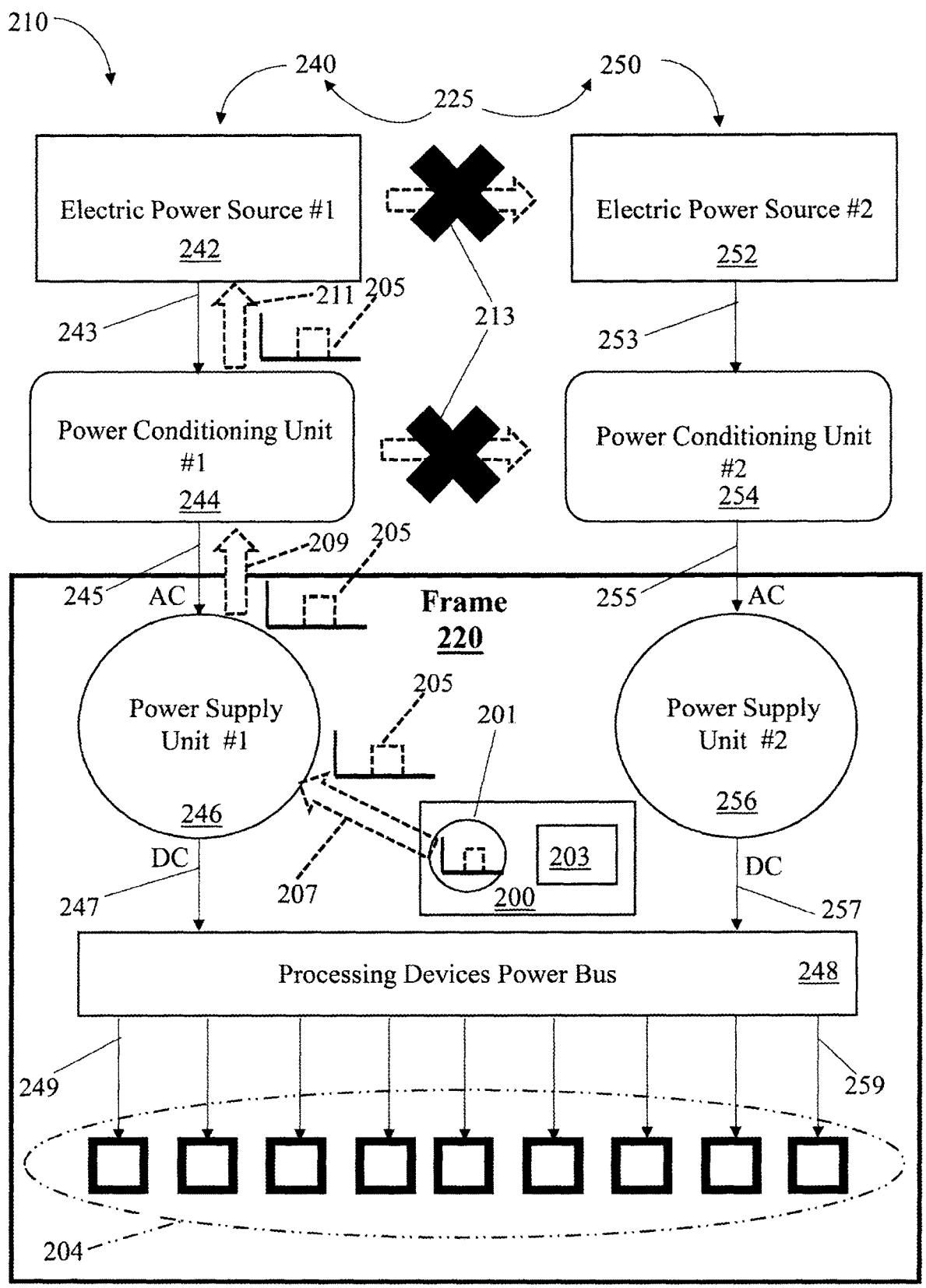
FIG. 2 is a block schematic diagram illustrating a system for detecting if one or more processing devices within a frame (or rack) have separately sourced power feeds in an electric power distribution system, according to one or more embodiments of the present disclosure.

Referring to FIG. 2, a block schematic diagram is presented illustrating a system 200 for detecting if one or more processing devices 204 within a frame 220 (or rack) have separately sourced electric power feeds 240 and 250 in an electric power distribution system 225, according to one or more embodiments of the present disclosure. In some embodiments, the electric power distribution system 225 for a data center 210 includes a plurality of separately sourced electric power feeds 240 and 250, where two feeds are non-limiting, and in some embodiments, there are three or more separately sourced power feeds (not shown). The term "separately sourced power feeds" refers to those distinct portions of those electric power distribution systems described herein that are sufficiently redundant such that a failure of any one component in one power feed will not disrupt electric power supply through the other power feed to the intended devices. For example, and without limitation, while it is understood that most electric power is supplied from a single electric utility and that a grid-wide outage will most likely affect the data center 210 through the electric power distribution system 225, for other more localized faults, an electric power source to the frame 220 will include either connections to a single, robust electric utility substation with multiple connections to a transmission and distribution system with one or more "throw-over" or "switching" features in the event of a fault on a portion of the substation. This disclosure is directed to those features and equipment downstream of the electric utility connections.

Therefore, in at least some embodiments, the data center 210 includes the electric power distribution system 225, that in turn includes two separately sourced electric power feeds 240 and 250 to provide redundant electric power to one or more frames 220. In some embodiments, rather than frames, the power is directed to individual racks within a server cabinet. The remainder of the present disclosure is directed toward powering frames, where the features described herein are adaptable to individual racks as well. The first electric power feed 240 includes a first electric power source 242 that includes those connections and equipment to provide electric power from an electric utility. In some embodiments, the origin of the electric power supplied to the first electric power source includes the owner of the data center 210 providing self-generated primary power, where the utility power is a secondary power provider. The first electric power source 242 includes the necessary transformers, cables, switchgear, circuit breakers, and instrumentation to effectively and reliably provide electric power from a generating entity (not shown) to meet the general requirements for the data center 210, such as, and without limitation, lighting, office outlets, etc.

In one or more embodiments, a first power conditioning unit 244 receives electric power 243 from the first electric power source 242, where the electric power 243 is of sufficient quality to provide the aforementioned general requirements. The first power conditioning unit 244 converts the general electric power 243 to a conditioned electric power 245. More specifically, the first power conditioning unit 244 (sometimes referred to as a line conditioner or power line conditioner) improves the quality of the received electric power 243, i.e., the voltage of the conditioned electric power 245 is within those design tolerances of the downstream equipment to function properly. In addition, in some embodiments, the first power conditioning unit 244 is further configured to execute additional functions such as, and without limitation, power factor correction, noise suppression/filtering, transient voltage impulse protection, and sinusoidal alternating current (AC) waveform voltage consistency within a narrow tolerance band over varying downstream (and, in some instances, upstream) current loads.

In at least some embodiments, the conditioned AC electric power 245 is transmitted into one or more of the frame 220 (only one shown) to a first power supply unit 246. In some embodiments, the first separately sourced electric power feed 240 includes the first power supply unit 246. In some embodiments, the first power supply unit 246 is a portion of the frame 220 that is electrically coupled to the first separately sourced electric power feed 240.

The first power supply unit 246 converts the conditioned AC electric power 245 to a low voltage (e.g., without limitation, 5 to 10 millivolts (mv)) regulated direct current (DC) electric power 247 within those design tolerances of the downstream equipment to function properly. The regulated DC electric power 247 is transmitted to a processing devices power bus 248 that provides regulated DC electric power 249 (only one labeled) to a plurality of processing devices 204 (referred to as processing devices 104 in FIG. 1), where the value of 9 processing devices 204 as shown is a non-limiting value.

The first electric power source 242, the first power conditioning unit 244, and the first power supply unit 246 are electrically coupled through any electrically conducting devices that enable conduction of the respective general electric power 243, conditioned AC electric power 245, and regulated DC electric power 247 as described herein, including, without limitation, cabling, wiring, conduits, and busses.

In some embodiments, the second separately sourced electric power feed 250 includes a second electric power source 252 that transmits electric power 253 to a second power conditioning unit 254 that transmits conditioned AC electric power 255 to a second power supply unit 256 that transmits regulated DC electric power 257 to the processing devices power bus 248, where the numbered items associated with the second separately sourced electric power feed 250 are substantially similar to those similarly numbered items as described for the first separately sourced electric power feed 240. The regulated DC electric power 257 is transmitted to the processing devices power bus 248 that provides regulated DC electric power 259 (only one labeled) to the plurality of processing devices 204.

In some embodiments, the first separately sourced electric power feed 240 or the second separately sourced electric power feed 250 is individually energized, while the opposite source is de-energized, where energization of the opposite source is executed when the presently energized source is undergoing a fault. In some embodiments, the first separately sourced electric power feed 240 and the second separately sourced electric power feed 250 are both energized and an auctioneering feature determines which of the two sources 242 and 252 are providing the respective regulated DC electric power 247 and 257.

In one or more embodiments, the data center 210 includes the system 200 for detecting if the processing devices 204 within the frame 220 have separately sourced electric power feeds 240 and 250 in the electric power distribution system 225. In some embodiments, the system 200 is an Ethernet-based system for messaging-over-power transceiver configuration, i.e., Ethernet-over-power. The system 200 includes one or more square wave message generators 201 (only one shown) and one or more square wave message receivers 203 (only one shown). In some embodiments, the system includes AC generation devices (not shown) that are configured to transmit low-power AC signals with a frequency between approximately 5 kilohertz (kHz) and approximately 500 kHz. In some embodiments, the system 200 includes the features to generate any signals that enable operation of the embodiments described herein. In some embodiments, the system 200 as described herein includes the messaging over AC line control module 132 embedded in the power management tool 130 (see FIG. 1).

In some embodiments, the square wave message generator 201 generates, under the direction of the messaging over AC line control module 132, square waves 205 with an amplitude between approximately 2.5 volts DC (VDC) and approximately 5 VDC, where any voltage that enables operation of the system 200 as described herein is used. In some embodiments, attenuation of the square waves 205 as they traverse the prescribed path is factored into the determination of the generation voltage amplitude thereof. In some embodiments, the square waves 205 are tagged with an identifier that will remain constant as the square wave 205 traverses its specified path, including upon receipt at the square wave message receivers 203. In some embodiments, the system 200 is communicatively and operably coupled to the first power supply unit 246. In some embodiments, the system 200 is communicatively and operably coupled to the second power supply unit 256. In some embodiments, the system 200 is directly, communicatively, and operably coupled to the first power conditioning unit 244 or the first electric power source 242 (or the similar devices in the second separately sourced electric power feed 250).

The square wave 205 is injected into the first separately sourced electric power feed 240, and, in some embodiments, the square ware 205 is injected into the second separately sourced electric power feed 250. Specifically, the square wave 205 is injected into the first power supply unit 246 as shown by the arrow 207, transmitted to the first power conditioning unit 244 as indicated by the arrow 209, and transmitted into the first electric power source 242 as indicated by the arrow 211. In some embodiments, one or more of the first power supply unit 246, the first power conditioning unit 244, and the first electric power source 242 include instrumentation (not shown) embedded therein that monitors the respective equipment for receipt of the square ware 205 and transmits a receipt acknowledgement to one or more of the messaging over AC line control module 132 and any monitoring device available to a user including, without limitation, a LED lamp on a panel and a pop-up block on a monitor. However, only the targeted recipient, i.e., the square wave message receiver 203, is configured to respond to the message upon receipt thereof.

In some embodiments, the square wave 205 is not detected on the second separately sourced electric power feed 250 by the square wave message receiver 203 or any of the instrumentation installed in the individual pieces of equipment, or the respective inter-device couplings therebetween. This result is indicated by the bold "Xs" in FIG. 2, where a near infinite resistance is indicated to define an open circuit between the first separately sourced electric power feed 240 and the second separately sourced electric power feed 250. Accordingly, there is no electrical interconnection between the first separately sourced electric power feed 240 and the second separately sourced electric power feed 250, and indications of such a result are transmitted to a user as previously described. In contrast, if an interconnection is discovered (as described for FIG. 3 herein), the appropriate communications are transmitted.

Figure 3:
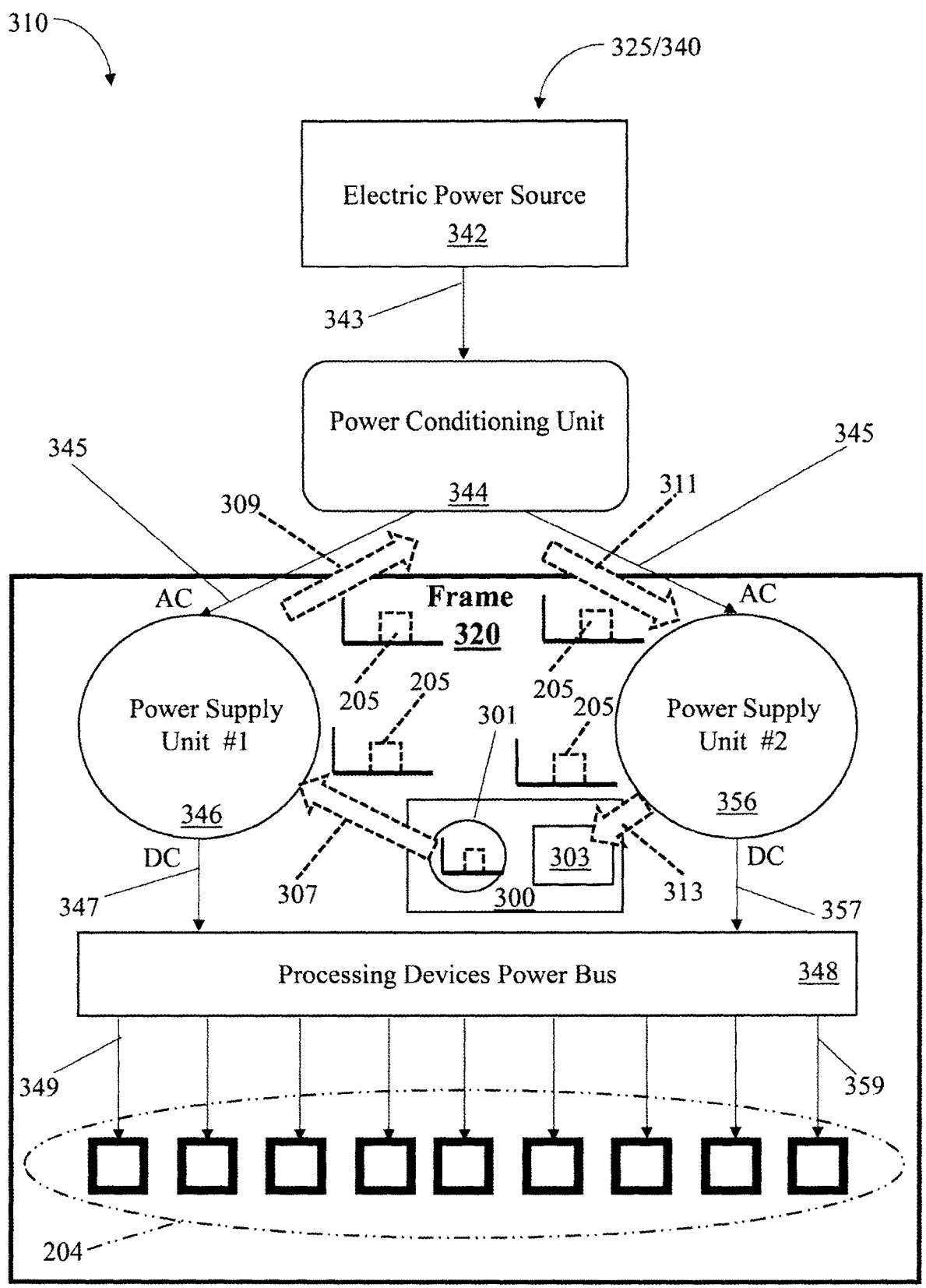
FIG. 3 is a block schematic diagram illustrating a system for detecting if one or more processing devices within a frame (or rack) have separately sourced power feeds in an electric power distribution system, according to one or more embodiments of the present disclosure.

Referring to FIG. 3, a block schematic diagram is presented illustrating a system 300 for detecting if one or more processing devices within the frame 320 (or rack) have separately sourced power feeds in an electric power distribution system 325, according to one or more embodiments of the present disclosure. In some embodiments, the system 300 is an Ethernet-based system for messaging-over-power transceiver configuration, i.e., Ethernet-over-power. In some embodiments, the electric power distribution system 325 for a data center 310 includes a single sourced electric power feed 340. In some embodiments, rather than frames, the power is directed to individual racks within a server cabinet. The remainder of the present disclosure is directed toward powering frames, where the features described herein are adaptable to individual racks as well.

Also referring to FIG. 2, the electric power feed 340 includes an electric power source 342 that is substantially similar to the electric power source 242. The electric power feed 340 also includes a power conditioning unit 344 (that is substantially similar to the first power conditioning unit 244) that is electrically coupled to, and receives electric power 343 from, the electric power source 342, where the electric power 343 is substantially similar to the electric power 243. The power conditioning unit 344 transmits a conditioned AC electric power 345 that is substantially similar to the conditioned AC electric power 245. In at least some embodiments, the power conditioning unit 344 is electrically coupled to a first power supply unit 346 and a second power supply unit 356 that reside in one or more frames 320 (only one shown). Therefore, in some embodiments, the conditioned AC electric power 345 is transmitted into the first power supply unit 346 and the second power supply unit 356. In some embodiments, the electric power feed 340 includes the first power supply unit 346 and the second power supply unit 356. In some embodiments, the first power supply unit 346 and the second power supply unit 356 are a portion of the frame 320 that is electrically coupled to the electric power feed 340.

The first power supply unit 346 and the second power supply unit 356 convert the conditioned AC electric power 345 to a low voltage (e.g., without limitation, 5 to 10 millivolts (mv)) regulated direct current (DC) electric power 347 and 357, respectively, within those design tolerances of the downstream equipment to function properly. The regulated DC electric power 347 and 357 are transmitted to a processing devices power bus 348 that provides regulated DC electric power 349 and 359, respectively, (only one of each labeled) to the plurality of processing devices 204 (referred to as processing devices 104 in FIG. 1), where the value of 9 processing devices 204 as shown is a non-limiting value.

The electric power source 342, the power conditioning unit 344, and first power supply unit 346 and the second power supply unit 356 are electrically coupled as shown and described through any electrically conducting devices that enable conduction of the respective general electric power 343, conditioned AC electric power 345, regulated DC electric power 347. and regulated DC electric power 357, as described herein, including, without limitation, cabling, wiring, conduits, and busses.

In some embodiments, the first power supply unit 346 or the second power supply unit 356 is individually energized, while the opposite unit is de-energized, where energization of the opposite unit is executed when the presently energized unit is undergoing a fault. In some embodiments, the first power supply unit 346 and the second power supply unit 356 are both energized and an auctioneering feature determines which of the two units 346 and 356 are providing the respective regulated DC electric power 347 and 357.

In one or more embodiments, the data center 310 includes the system 300 for detecting if the processing devices 204 within the frame 320 have separately sourced electric power feeds in the electric power distribution system 325. The system 300 includes one or more square wave message generators 301 (only one shown) and one or more square wave message receivers 303 (only one shown). In some embodiments, the system includes AC generation devices (not shown) that are configured to transmit low-power AC signals with a frequency between approximately 5 kilohertz (kHz) and approximately 500 kHz. In some embodiments, the system 300 includes the features to generate any signals that enable operation of the embodiments described herein. In some embodiments, the system 300 as described herein includes the messaging over AC line control module 132 embedded in the power management tool 130 (see FIG. 1).

In some embodiments, the square wave message generator 301 generates, under the direction of the messaging over AC line control module 132, square waves 205 with an amplitude between approximately 2.5 volts DC (VDC) and approximately 5 VDC, where any voltage that enables operation of the system 300 as described herein is used. In some embodiments, attenuation of the square waves 205 as they traverse the prescribed path is factored into the determination of the generation voltage amplitude thereof. In some embodiments, the square wave message generator 301 is communicatively and operably coupled to the first power supply unit 346. In some embodiments, the square wave message generator 301 is communicatively and operably coupled to the second power supply unit 356. In some embodiments, the system 300 is directly, communicatively, and operably coupled to the power conditioning unit 344 or the electric power source 342.

The square wave 205 is injected into the electric power feed 340. Specifically, the square wave 205 is injected into the first power supply unit 346 as shown by the arrow 307, transmitted to the power conditioning unit 344 as indicated by the arrow 309, transmitted into the first power supply unit 346, as indicated by the arrow 311, and is then captured by the square wave message receiver 303, as indicated by the arrow 313. In some embodiments, one or more of the first power supply unit 346, the power conditioning unit 344, and the second power supply unit 356 include instrumentation (not shown) embedded therein that monitors the respective equipment for receipt of the square ware 205 and transmits a receipt acknowledgement to one or more of the messaging over AC line control module 132 and any monitoring device available to a user including, without limitation, a LED lamp on a panel and a pop-up block on a monitor. In some embodiments, the square waves 205 are tagged with an identifier that will remain constant as the square wave 205 traverses its specified path, including upon receipt at the square wave message receivers 303.

In some embodiments, the square wave 205 is detected by the square wave message receiver 303 or any of the instrumentation installed in the individual pieces of equipment, or the respective inter-device couplings therebetween. Accordingly, there is an electrical interconnection between the first power supply unit 346 and the second power supply unit 356, and indications of such a result are transmitted to a user as previously described.

The embodiments described with respect to FIG. 3 are presented as a simplistic configuration where the first power supply unit 346 and the second power supply unit 356 are clearly coupled through the power conditioning unit 344 and the respective electrical interconnection therebetween. However, the simplistic configuration presents the concepts of implementing the system 300.

Referring again to FIG. 2, in some instances, the root cause of the non-redundancies associated with the first electric power feed 240 and the second electric power feed 250 to the frame 220 include relying on human oversight to verify that the respective AC cables are extending between redundant power supply components at commissioning of the electric power supply system 225 for the data center 210. In some instances, such unreliable human oversight may also result in not fully restoring the electric power supply system 225 from previous maintenance activities that required de-energizing of any of the redundant electric power supply components. Accordingly, the closed circuit effect as shown in FIG. 3 through the arrows 307, 309, 311, and 313 may also be found in FIG. 2.

Referring to FIG. 4, a flow chart is presented illustrating a process 400 for detecting if one or more processing devices have separately sourced power feeds in an electric power distribution system, according to one or more embodiments of the present disclosure. The process includes determining 402 transmission of a first signal in a first electric path, where the determining step 402 includes capturing the first signal through the respective sensing devices (not shown). The process 400 is executed substantially through the messaging over AC line control module 132 (see FIG. 1). Referring to FIG. 2, the first signal is the square wave 205 that is generated and injected 404 into a first component, e.g., the first power supply unit 246 (the first power supply unit 346 in FIG. 3) in the first electric power feed 240 (the electric power feed 340 in FIG. 3). In addition, the first signal (the square wave 205) is detected 406 at a second component, i.e., one or more of the first power supply unit 246, the first power conditioning unit 244, and the first electric power source 242 include the aforementioned sensors, i.e., instrumentation (not shown) embedded therein that monitors the respective equipment for receipt of the square ware 205 and transmits a receipt acknowledgement to one or more of the messaging over AC line control module 132 and any monitoring device available to a user including, without limitation, a LED lamp on a panel and a pop-up block on a monitor. Similarly, in FIG. 3, the square wave 205 is detected by the square wave message receiver 303 or any of the instrumentation installed in the individual pieces of equipment (i.e., the first power supply unit 346 and the power conditioning unit 344), or the respective electric couplings therebetween.

The process 400 also includes the step of monitoring 408 for, i.e., attempting to capture, a second signal in a second electric path that is different from the first electric path, through monitoring 410 at least one portion of the second electric path for the first signal, where the second signal is the first signal. Referring to FIG. 2, one or more of the second electric power source 252, the second power conditioning unit 254, the second power supply unit 256, and the square wave message receiver 203, and the respective electric couplings therebetween, are monitored for the second signal, which is substantially the square wave 205 with some known attenuation. With reference to FIG. 3, the second power supply unit 356 and the square wave message receiver 203, and the respective electric couplings therebetween, are monitored for the second signal, through the respective installed instrumentation, which is substantially the square wave 205 with some known attenuation.

In one or more embodiments, the process 400 proceeds to a determination 411 with respect to determining 411 if there is electrical isolation between the first electric path and the second electric path.

Figure 4A:
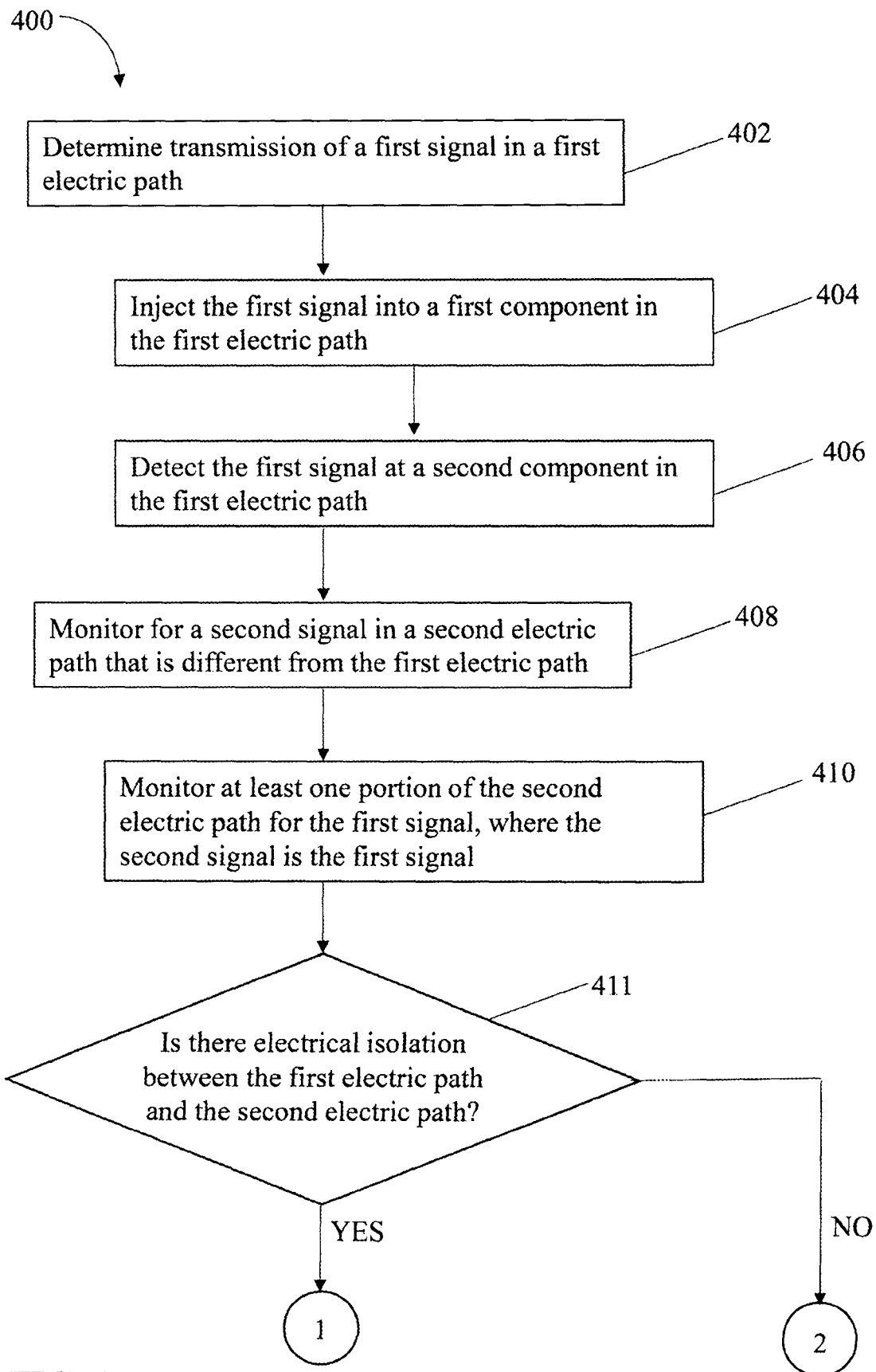
FIG. 4A is a flow chart illustrating a process for detecting if one or more processing devices have separately sourced power feeds in an electric power distribution system, according to one or more embodiments of the present disclosure.
Figure 4B:
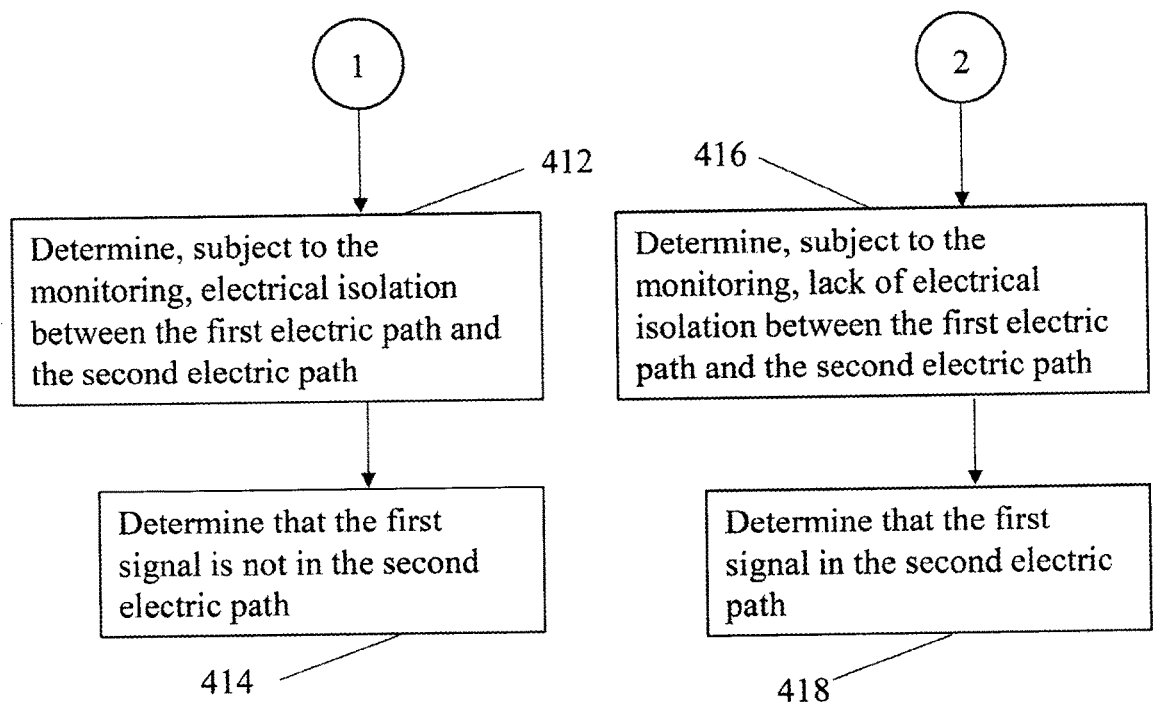
FIG. 4B is a continuation of the flow chart from FIG. 4A, according to one or more embodiments of the present disclosure.

Referring to FIG. 4B, a continuation of the flow chart from FIG. 4A is presented, according to one or more embodiments of the present disclosure. Continuing to also refer to FIGS. 2, 3, and 4A, in some embodiments, as a consequence of a "YES" result for the determination step 411, the respective systems 200 and 300 determine 412 electrical isolation between the first electric path (for FIG. 2, the separately sourced electric power feed 240) (for FIG. 3, the first power supply unit 346) and the second electric path (for FIG. 2, the separately sourced electric power feed 250) (for FIG. 3, the second power supply unit 356) due to determining 414 that the square wave 205 is not detected therein. Alternatively, as a consequence of a "NO" result for the determination step 411, a lack of sufficient electrical isolation is determined 416 through determining 418 that the square wave is detected in the respective second electric paths by the respective systems 200 and 300.

Figure 5A:
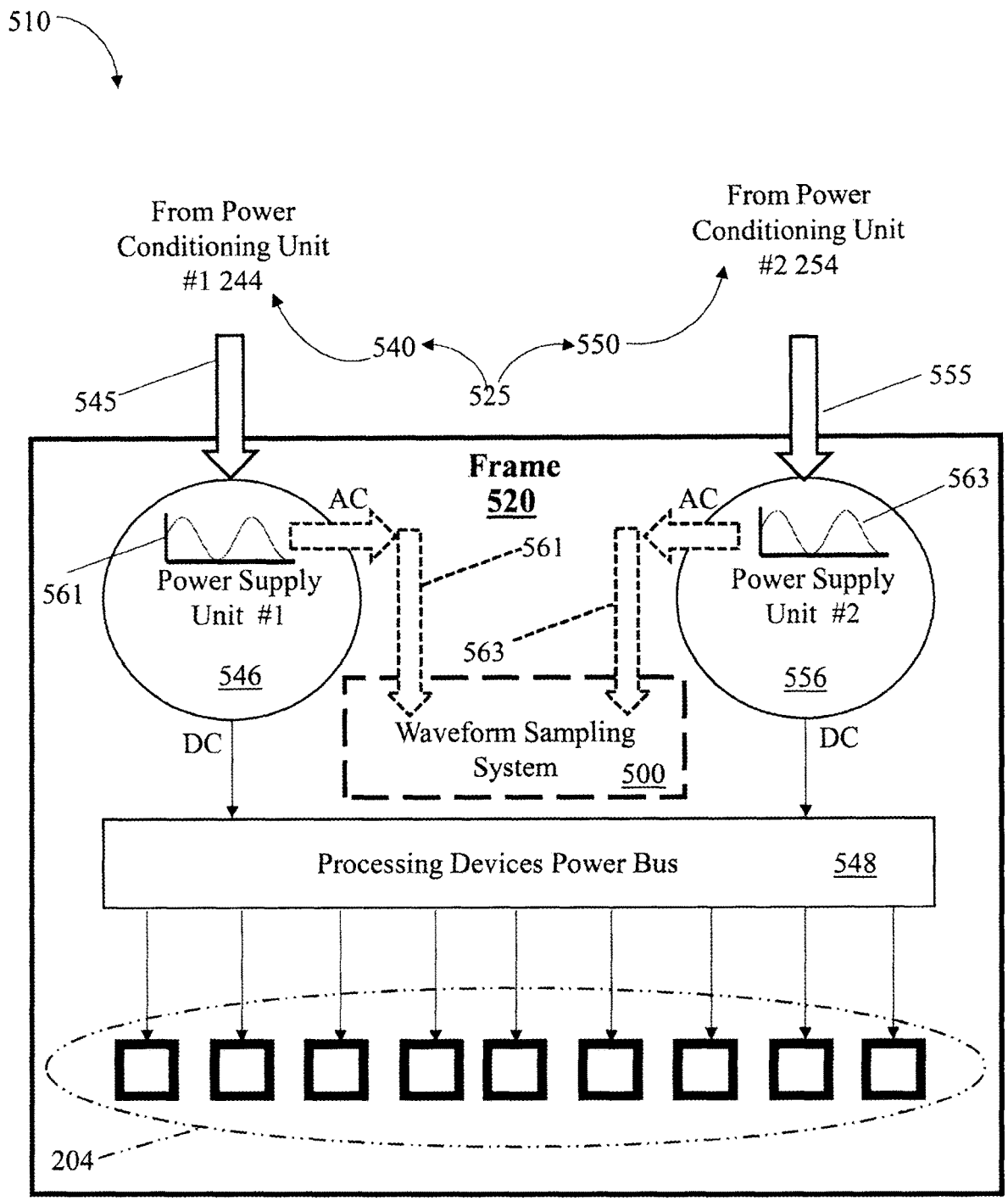
FIG. 5A is a block schematic diagram illustrating a system for detecting if one or more processing devices within a frame (or rack) have separately sourced power feeds in an electric power distribution system, according to one or more embodiments of the present disclosure.

Referring to FIG. 5A, a block schematic diagram is presented illustrating a system 500 for detecting if one or more processing devices within a frame (or rack) have separately sourced power feeds in an electric power distribution system, according to one or more embodiments of the present disclosure. A data center 510 includes an electric power system 525 that includes a first separately sourced electric power feed 540 and a second separately sourced electric power feed 550 that are substantially similar to their similarly numbered counterparts in FIG. 2. As such, the first power supply unit 546 receives conditioned electric power 545 from the first power conditioning unit 244 and the second power supply unit 556 receives conditioned electric power 555 from the second power conditioning unit 254.

In one or more embodiments, a waveform sampling system 500 is communicatively and operably coupled to the AC side of the first power supply unit 546 and the AC side of the second power supply unit 556. The waveform sampling system 500 is substantially controlled through the waveform sampling control module 134 (see FIG. 1) and samples the conditioned electric power 545 through transmission of one or more first waveform samples 561. In addition, the waveform sampling system 500 samples the conditioned electric power 555 through transmission of one or more second waveform samples 563.

Figure 5B:
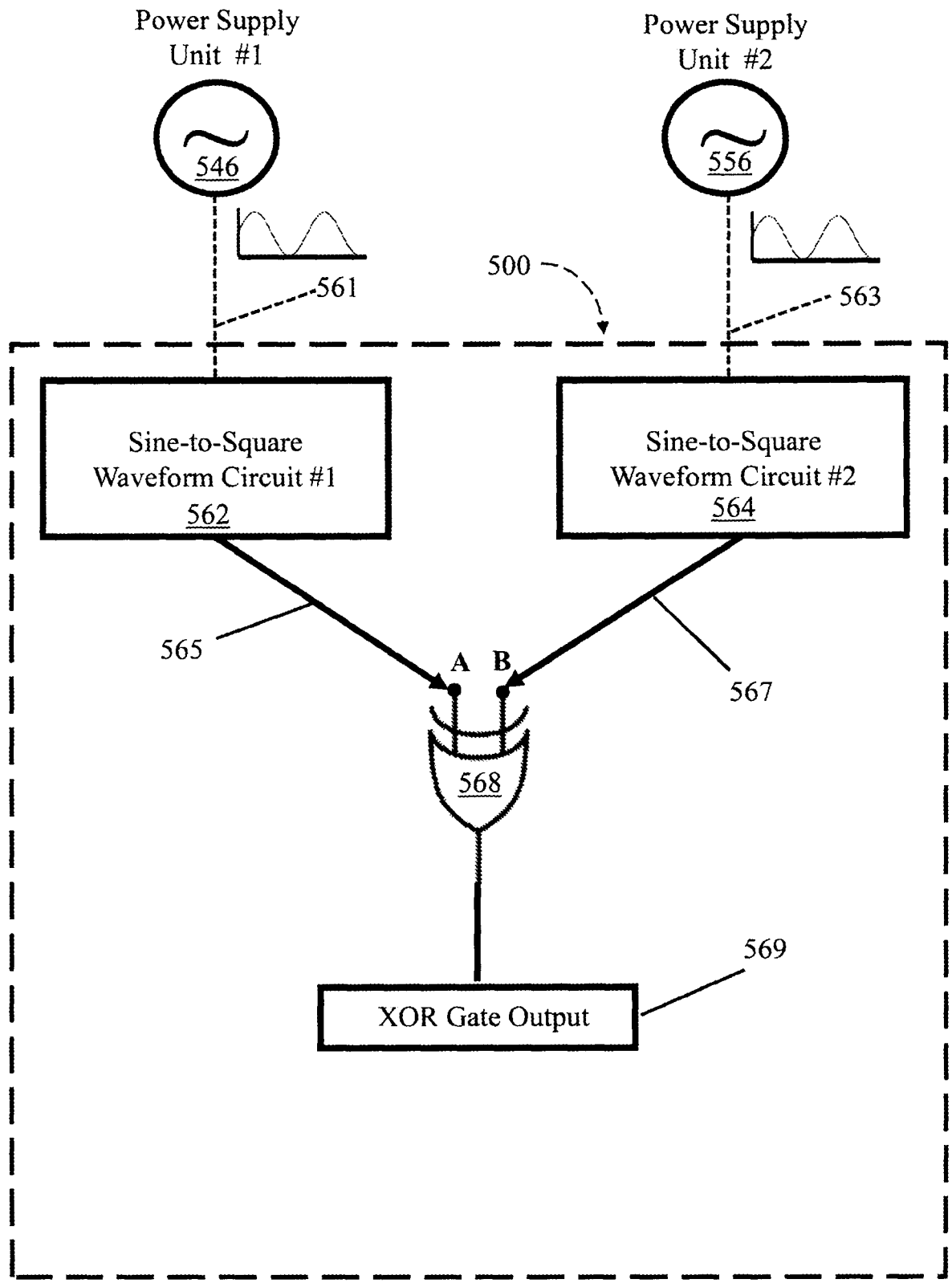
FIG. 5B is a block schematic diagram illustrating an expanded view of the system shown in FIG. 5A, according to one or more embodiments of the present disclosure.

Referring to FIG. 5B, a block schematic diagram is presented illustrating an expanded view of the system 500 shown in FIG. 5A, according to one or more embodiments of the present disclosure. The system 500 includes a first sine-to-square waveform circuit 562 that receives the first waveform samples 561 and converts them into first square waves 565. Similarly, the system 500 includes a second sine-to-square waveform circuit 564 that receives the second waveform samples 563 and converts them into second square waves 567. The first square waves 565 are transmitted to a A-terminal of an XOR gate 568 and the second square waves 567 are transmitted to a B-terminal of the XOR gate 568. The XOR gate 568 converts the incoming square waves 565 and 567 into binary values, where a non-zero value for the square waves 565 and 567, e.g., and without limitation, an amplitude value between approximately 2.5 VDC and approximately 5 VDC results in a binary value of "1," where any voltage that enables operation of the system 500 as described herein is used.

Therefore, in at least some embodiments, the system 500 is a zero-crossing circuit with comparator features that outputs a square wave, where each of the two inputs into the XOR gate 568 use the assigned circuit of the two zero-crossing circuits.

A zero value for the square waves 565 and 567, i.e., an amplitude value of approximately "0" VDC, results in a binary value of "0." The XOR gate 568 generates an output of either "0" or "1" according to following rules: A=0, B=0, output 569=0; A=1, B=0, output 569=1; A=0, B=1, output 569=1; and, A=1, B=1, output 569=1. Various collections of outputs 569 are discussed with respect to FIGS. 6A through 6C.

Figure 6A:
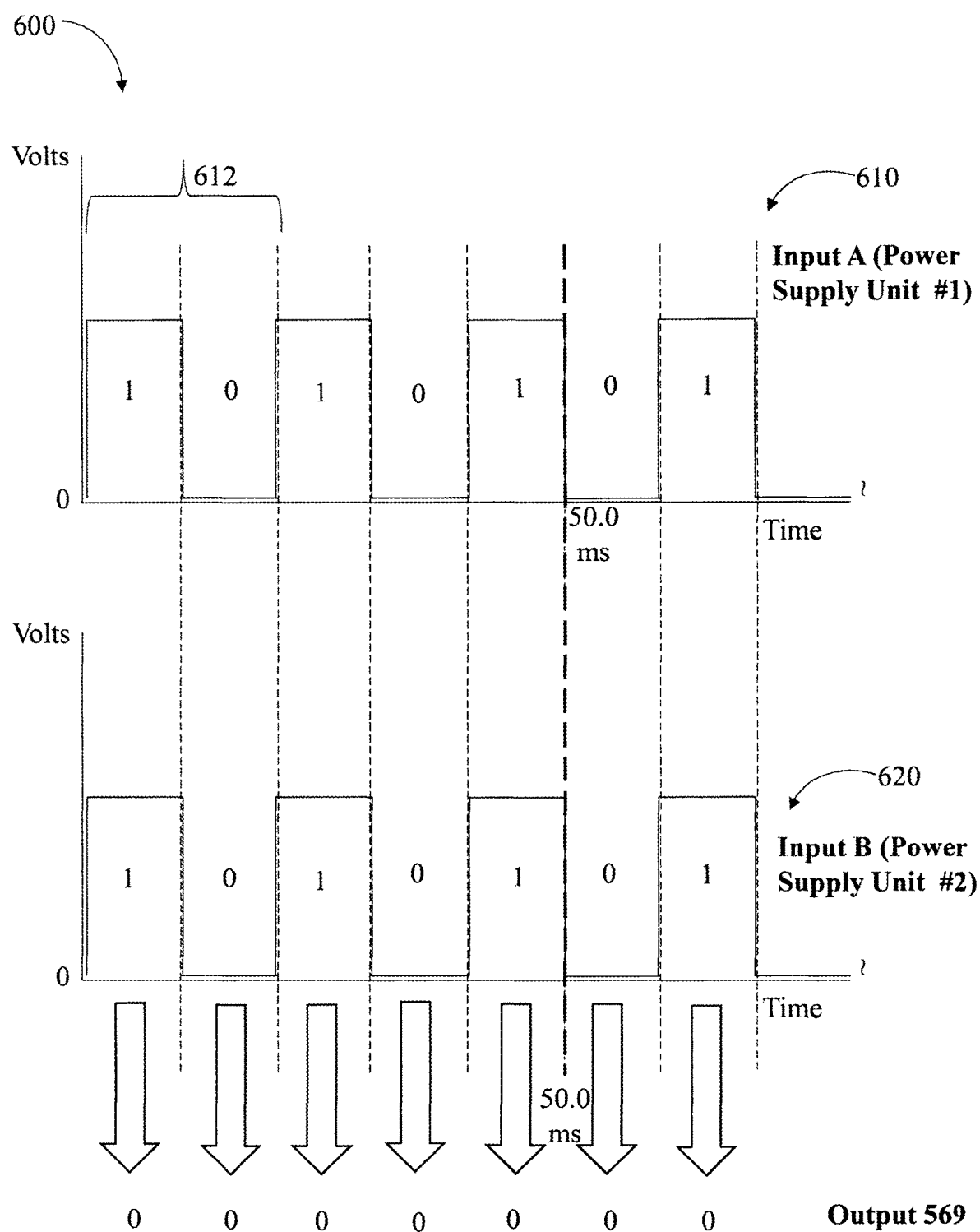
FIG. 6A is a schematic diagram illustrating waveforms captured by the system shown in FIG. 5 according to one or more embodiments of the present disclosure.

Referring to FIG. 6A, a schematic diagram is presented illustrating waveforms 600 captured by the system 500 shown in FIGS. 5A and 5B according to one or more embodiments of the present disclosure. The waveforms 600 include the input A 610 to the XOR gate 568 and the input B 620 to the XOR gate 568. Each full cycle of the sinusoidal waveforms 561 and 563 is equivalent to the cycle period 612, therefore there are 60 cycle periods 612 for a 60 Hz sinusoidal waveform, and 50.0 ms is merely used as a reference.

In some embodiments, sampling the output 569 is executed by the waveform sampling control module 134 (see FIG. 1), where the sampling frequency is configurable by the user. In some embodiments, the sampling frequency is set to 12 samples per 60 cycles, i.e., a sample is obtained every 83.3 ms. In some embodiments, the sampling frequency is set to 16 samples per 60 cycles, i.e., a sample is obtained every 62.5 ms. In some embodiments, the sampling frequency is set to any value that enables operation of the system 500 as described herein.

The waveforms 600 demonstrate the outputs 569 of the XOR gate 568 will always be approximately 0 when the two AC waveforms 561 and 563 are substantially in phase with each other. Therefore, regardless of the sampling frequency, the outputs 569 will always be 0. The two waveforms 561 and 563 being substantially in phase with each other is an indicator that they may be transmitted from the same source, i.e., the electric power is not from separately sourced power feeds. In general, separately sourced AC power feeds will typically have a slight phase difference on the order of magnitude of fractions of a millisecond to microseconds.

Figure 6B:
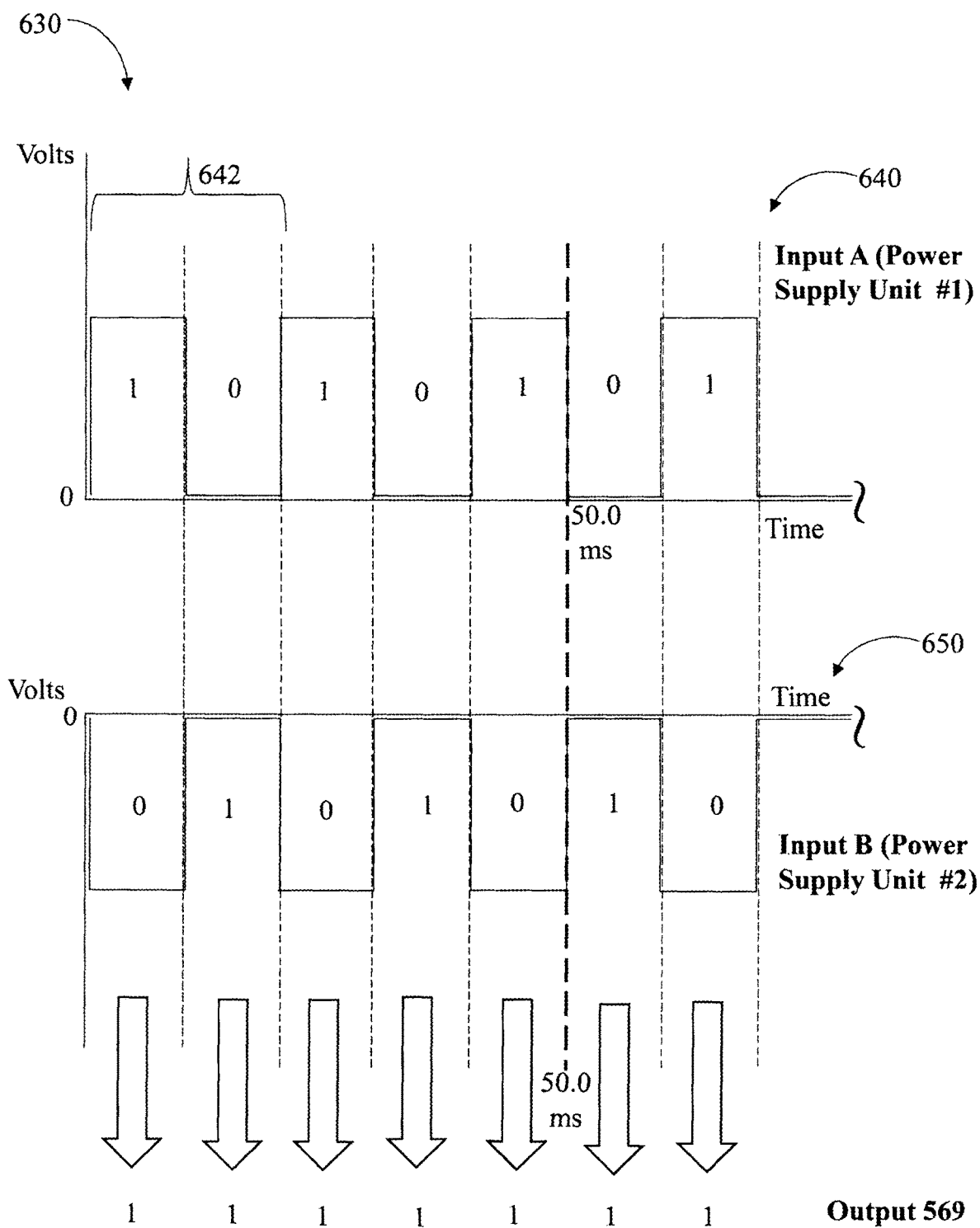
FIG. 6B is a schematic diagram illustrating waveforms captured by the system shown in FIG. 5 according to one or more embodiments of the present disclosure.

Referring to FIG. 6B, a schematic diagram is presented illustrating waveforms 630 captured by the system 500 shown in FIGS. 5A and 5B according to one or more embodiments of the present disclosure. The waveforms 630 include the input A 640 to the XOR gate 568 and the input B 650 to the XOR gate 568. Each full cycle of the sinusoidal waveforms 561 and 563 is equivalent to the cycle period 642, therefore there are 60 cycle periods 642 for a 60 Hz sinusoidal waveform, and 50.0 ms is merely used as a reference.

In some embodiments, where the sampling frequency is configurable by the user, in some embodiments, the sampling frequency is set to 12 samples per 60 cycles, i.e., a sample is obtained every 83.3 ms. In some embodiments, the sampling frequency is set to 16 samples per 60 cycles, i.e., a sample is obtained every 62.5 ms. In some embodiments, the sampling frequency is set to any value that enables operation of the system 500 as described herein.

The waveforms 630 demonstrate the outputs 569 of the XOR gate 568 will always be approximately 1 when the two AC waveforms 561 and 563 are approximately 180 degrees out of phase with each other. Therefore, regardless of the sampling frequency, the outputs 569 will always be 1. The two waveforms 561 and 563 being 180 degrees out of phase with each other is an indicator that one of the two is anomalous, possibly resulting from the use of a common transformer with two sets of windings that are 180 degrees out of phase with each other, i.e., they may be transmitted from the same source, i.e., the electric power is not from separately sourced power feeds. In general, separately sourced AC power feeds will typically have a slight phase difference on the order of magnitude of fractions of a millisecond to microseconds.

Figure 6C:
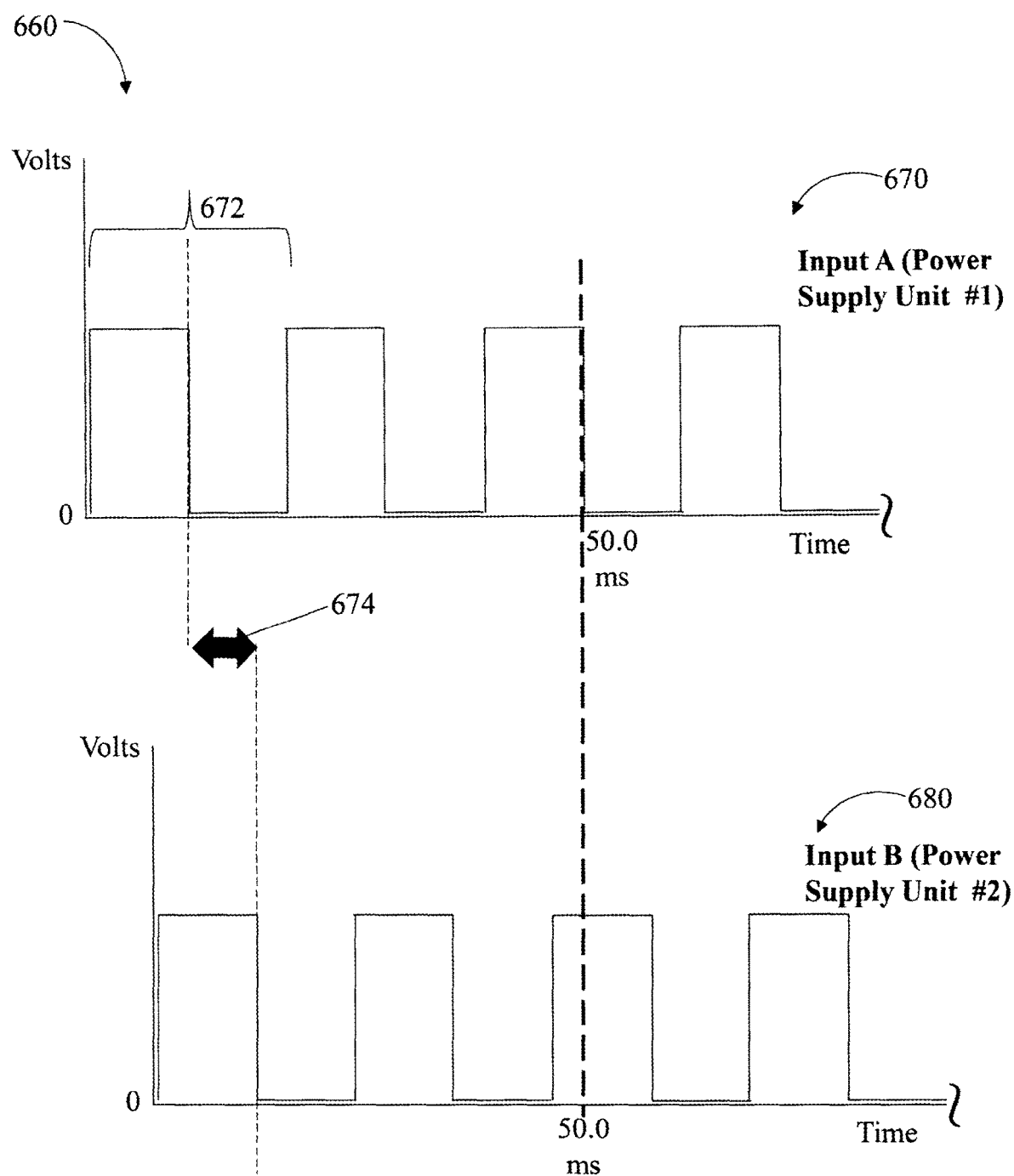
FIG. 6C is a schematic diagram illustrating waveforms captured by the system shown in FIG. 5 according to one or more embodiments of the present disclosure.

Referring to FIG. 6C, a schematic diagram is presented illustrating waveforms 660 captured by the system 500 shown in FIGS. 5A and 5B according to one or more embodiments of the present disclosure. The waveforms 660 include the input A 670 to the XOR gate 568 and the input B 680 to the XOR gate 568. Each full cycle of the sinusoidal waveforms 561 and 563 is equivalent to the cycle period 642, therefore there are 60 cycle periods 672 for a 60 Hz sinusoidal waveform, and 50.0 ms is merely used as a reference. A phase difference 674 of 120 degrees is indicated between the sinusoidal waveforms 561 and 563.

In some embodiments, where the sampling frequency is configurable by the user, in some embodiments, the sampling frequency is set to 12 samples per 60 cycles, i.e., a sample is obtained every 83.3 ms. In some embodiments, the sampling frequency is set to 16 samples per 60 cycles, i.e., a sample is obtained every 62.5 ms. In some embodiments, the sampling frequency is set to any value that enables operation of the system 500 as described herein.

For those embodiments with a determined sampling frequency of 12 samples per 60 cycles, the sampling of the outputs 569 includes at 83.3 ms, a value of 1; at 166.8 ms, a value of 1; at 250 ms, a value of 1; at 333.3 ms, a value of 1, at 416.7 ms, a value of 0; and at 500 ms, a value of 0; etc. Therefore, for 60 cycles in 1000 ms, the resultant output is 111100 111100, and that particular sequence will not change for a sampling frequency of 12 samples per 60 cycles (1000 ms).

For those embodiments with a determined sampling frequency of 16 samples per 60 cycles, the sampling of the outputs 569 includes at 62.5 ms, a value of 1; at 125.0 ms, a value of 1; at 187.5 ms, a value of 1; at 250.0 ms, a value of 0, at 312.5 ms, a value of 1; at 375 ma, a value of 1, at 437.5 ms, a value of 1, and at 500 ms, a value of 0; etc. Therefore, for 60 cycles in 1000 ms, the resultant output is 11101110 11101110, and that particular sequence will not change for a sampling frequency of 16 samples per 60 cycles (1000 ms).

The waveforms 670 demonstrate the outputs 569 of the XOR gate 568 will have a consistent known pattern that is easily recognizable from the particular pattern exhibited. Therefore, the waveform sampling control module 134 will recognize these patterns and will transmit the notification that the 120 degree phase difference is indicative of two different phases from the same transformer being the source of the sinusoidal waveforms 561 and 563, i.e., they may be transmitted from the same source, i.e., the electric power is not from separately sourced power feeds.

In one or more embodiments, and regardless of the sampling frequency, those sampling outputs that indicate one of an approximately zero degree phase difference, an approximately 120 degree phase difference, and a 180 degree phase difference indicate non-redundant power sources. In contrast, those sampling outputs that do not indicate one of the three instances are indicative of sufficient phase difference associated with separate, isolated, and redundant power sources. For example, and without limitation, using 16 samples per 60 cycles, a repeating sequence of 00001111 00001111 is indicative of separate, isolated, and redundant power sources.

Referring to FIG. 7, a flow chart is presented illustrating a process 700 for detecting if one or more processing devices have separately sourced power feeds in an electric power distribution system, according to one or more embodiments of the present disclosure. The process includes determining 702 transmission of a first signal in a first electric path, where the determining step 702 includes capturing the first signal through the respective sensing devices, i.e., instrumentation (not shown). The process 700 is executed substantially through the waveform sampling control module 134 (see FIG. 1). Referring to FIGS. 5A and 5B, the first signal is the first AC waveform 561 transmitted from the first power supply unit 546, where the AC waveform 561 is captured 704 from one or more portions of the electric path, i.e., the first power supply unit 546. The first AC waveform 561 is converted 706 into a first square wave 565 (see input A 610, 640, and 670 in FIGS. 6A through 6C, respectively) by the first sine-to-square waveform circuit 562.

The process 700 also includes the step of monitoring 708 for, i.e., capturing a second signal in a second electric path that is different from the first electric path, where the second signal is the second AC waveform 563 transmitted from the second power supply unit 556, where the AC waveform 563 is captured 710 from one or more portions of the second electric path, i.e., the second power supply unit 556. The second AC waveform 563 is converted 712 into a second square wave 567 (see input B 620, 670, and 680 in FIGS. 6A through 6C, respectively) by the second sine-to-square waveform circuit 564. The sampling of each of the waveforms is executed at a predetermined sampling rate to generate a known pattern that is recognized as representative of the relationship between the two waveforms, including a phase difference between the first AC waveform 561 and the second AC waveform 563. The process 700 includes comparing 714 the second square wave 567 with the first square wave 565.

Figure 7A:
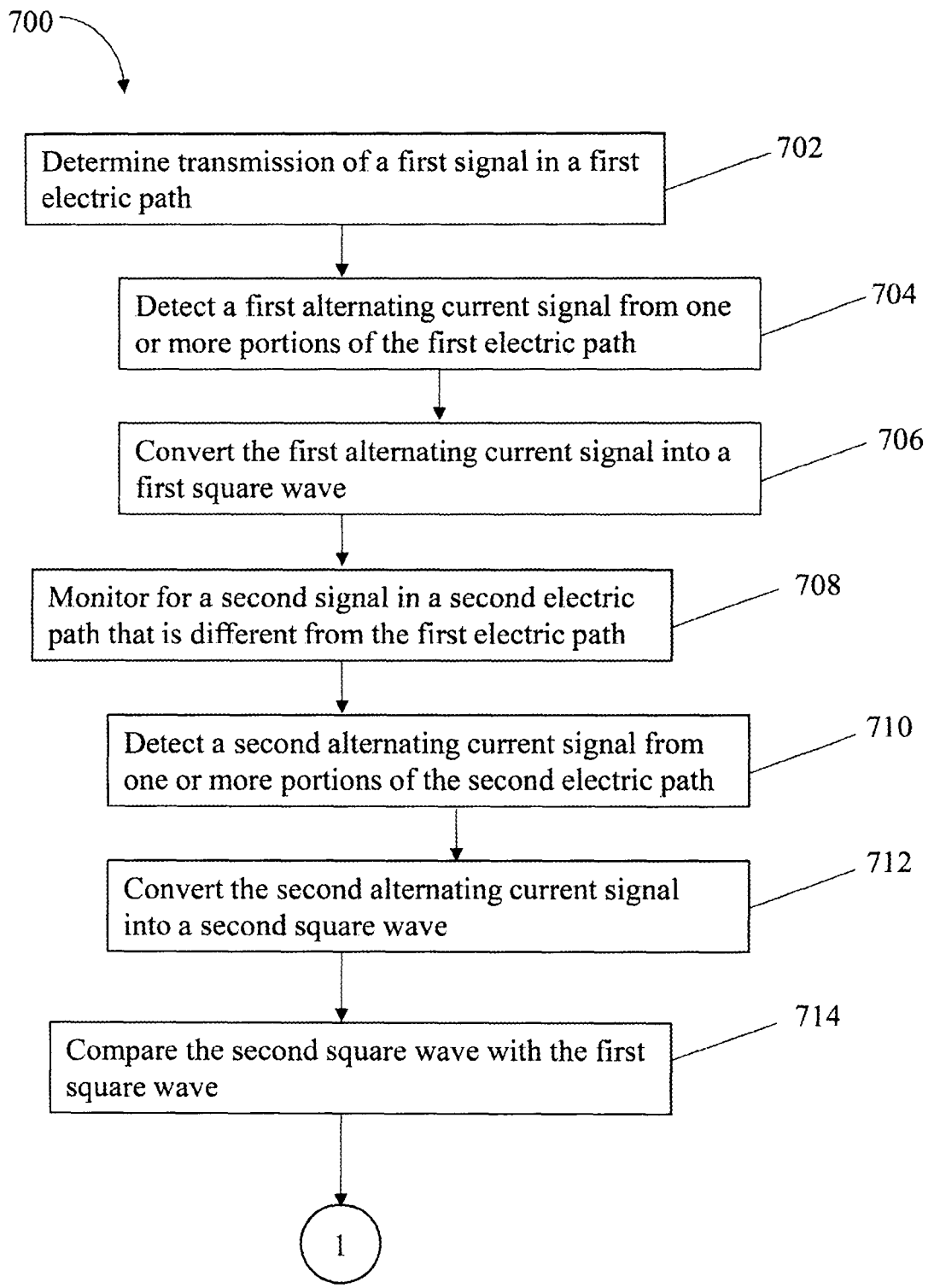
FIG. 7A is a flow chart illustrating a process for detecting if one or more processing devices have separately sourced power feeds in an electric power distribution system, according to one or more embodiments of the present disclosure.
Figure 7B:
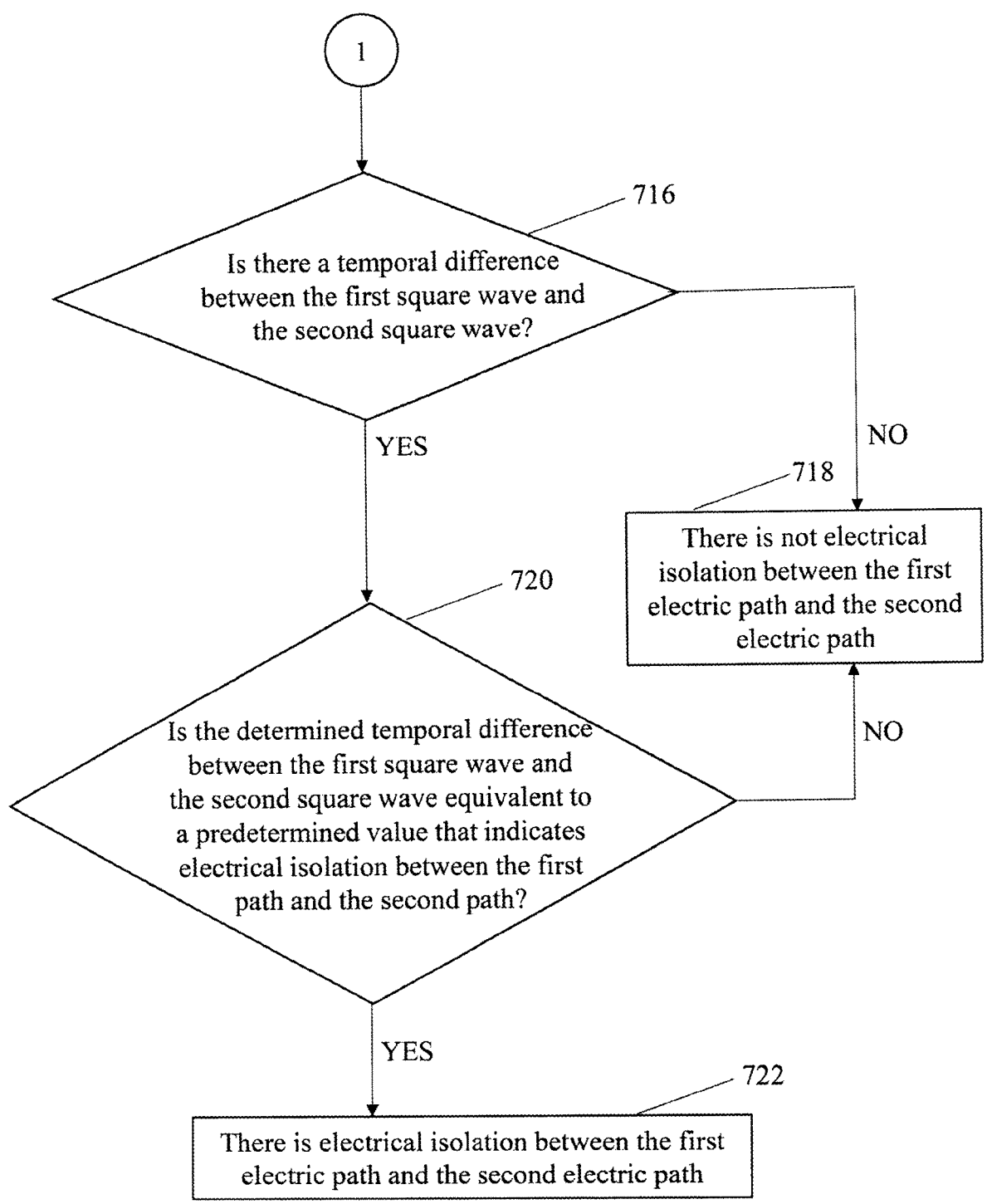
FIG. 7B is a continuation of the flow chart from FIG. 7A, according to one or more embodiments of the present disclosure.

Referring to FIG. 7B, a continuation of the flow chart from FIG. 7A is presented, according to one or more embodiments of the present disclosure. Continuing to also refer to FIGS. 5A-B. 6A-C, and 7A, in some embodiments, the process 700 includes a determination 716 being made with respect to if there is a temporal difference between the first square wave 565 and the second square wave 567 as a consequence of the comparing step 714. A "NO" result of the determination step 716 results in a determination 718 that there is not electrical isolation between the first power supply unit 546 and the second power supply unit 556 (as described with respect to FIG. 6A). A "YES" result of the determination step 716 results in a determination 720 with respect to if the determined temporal difference between the first square wave 565 and the second square wave 567 is equivalent to a predetermined value that indicates electrical isolation between the first power supply unit 546 and the second power supply unit 556. A "NO" response to the determination step 720 results in the determination 718 that there is not electrical isolation between the first power supply unit 546 and the second power supply unit 556 (as described with respect to FIGS. 6B and 6C). A "YES" response to the determination step 720 results in the determination 722 that there is electrical isolation between the first power supply unit 546 and the second power supply unit 556 (as described with respect to FIG. 6C).

The embodiments as disclosed and described herein are configured to provide an improvement to the technological field associated with providing electric power to computer systems, and, more specifically, toward detecting if one or more processing devices have separately sourced power feeds. As such, the embodiments described herein integrate detecting electrical isolation between a first electric path and a second electric path to facilitate improved redundancy between the various sources of electric power to a data center.

The embodiments described herein facilitate the aforementioned integration into a practical application of a computer system, computer readable storage medium, and computer-implemented method for dynamically, and automatically, determine the power sources are separate, isolated, and redundant. Specifically, the embodiments described herein present an improvement to the known electric power supply systems for frames and racks to automatically verify, with little to no human interaction, that the respective frames and racks are in fact electrically coupled to redundant power supplies.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
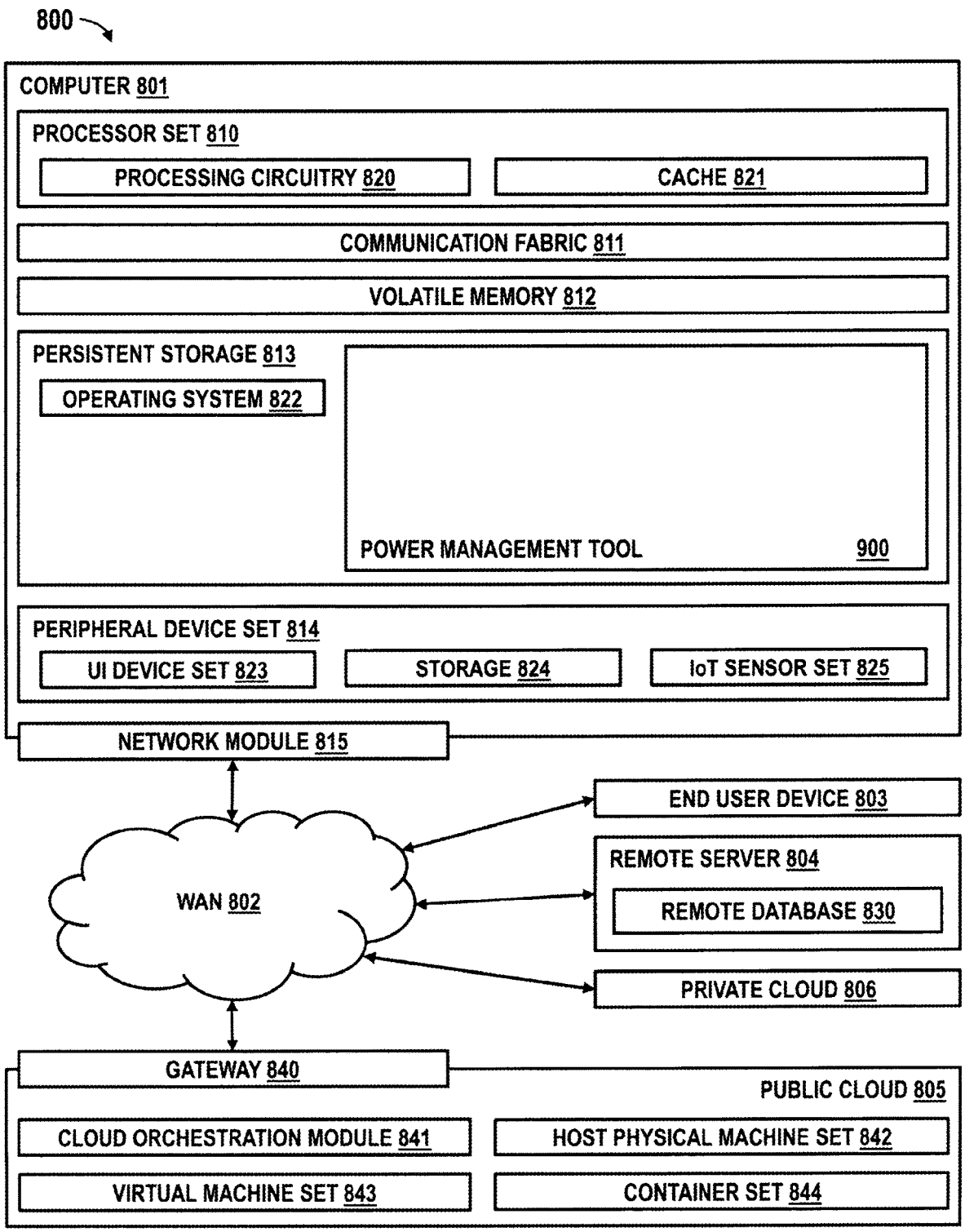
FIG. 8 is as block schematic diagram illustrating an example of a computing environment for the execution of at least some of the computer code involved in performing the disclosed methods described herein, in accordance with some embodiments of the present disclosure.

Referring to FIG. 8, a block schematic diagram is presented illustrating an example of a computing environment for the execution of at least some of the computer code involved in performing the disclosed methods described herein, in accordance with some embodiments of the present disclosure.

Computing environment 800 contains an example of an environment for the execution of at least some of the computer code involved in performing the disclosed methods, such as power management tool 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 821 and the other storage media discussed below. The program instructions, and associated data, are accessed by processor set 810 to control and direct performance of the disclosed methods. In computing environment 800, at least some of the instructions for performing the disclosed methods may be stored in block 900 in persistent storage 813.

Communication fabric 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the disclosed methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the disclosed methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for detecting if one or more processing devices have separately sourced power feeds comprising:
   one or more processing devices;
   one or more memory devices communicatively and operably coupled to the one or more processing devices; and
   a power management tool communicatively and operably coupled to the one or more processing devices, the power management tool configured to:
      determine transmission of a message in a first electric path;
      monitor for an acknowledgement to the message in a second electric path, the second electric path different from the first electric path; and
      determine, based on whether the acknowledgment to the message is detected in the second electric path, whether there is electrical isolation between the first electric path and the second electric path.

2. The system of claim 1, wherein the determining transmission of the message in the first electric path comprises: injecting the message into a first component in the first electric path.

3. The system of claim 2, wherein the determining transmission of the message in the first electric path further comprises detecting the acknowledgement in the first electric path.

4. The system of claim 1, wherein the determining whether there is electrical isolation between the first electric path and the second electric path comprises:
   in response to detecting the acknowledgement in the second electric path, determining that there is not electrical isolation between the first electric path and the second electric path.

5. The system of claim 1, wherein the determining whether there is electrical isolation between the first electric path and the second electric path comprises:
   in response to not detecting the acknowledgement in the second electric path, determining that there is electrical isolation between the first electric path and the second electric path.

6. The system of claim 1, wherein the message is a square wave.

7. The system of claim 1, wherein the message is sent using Ethernet-over-power.

8. A computer-implemented method for detecting if one or more processing devices have separately sourced power feeds, the method comprising:
   determining transmission of a message in a first electric path;
   monitoring for an acknowledgement to the message in a second electric path, the second electric path different from the first electric path; and
   determining, based on whether the acknowledgement is detected in the second electric path, whether there is electrical isolation between the first electric path and the second electric path.

9. The method of claim 8, wherein the determining transmission of
   the message in the first electric path comprises:
      injecting the message into a first component in the first electric path.

10. The method of claim 9, wherein the determining transmission of the message in the first electric path further comprises detecting the acknowledgement in the first electric path.

11. The method of claim 8, wherein the determining whether there is electrical isolation between the first electric path and the second electric path comprises:
    in response to detecting the acknowledgement in the second electric path, determining that there is not electrical isolation between the first electric path and the second electric path.

12. The method of claim 8, wherein the determining whether there is electrical isolation between the first electric path and the second electric path comprises:
    in response to not detecting the acknowledgement in the second electric path, determining that there is electrical isolation between the first electric path and the second electric path.

13. The method of claim 8, wherein the message is a square wave.

14. The method of claim 8, wherein the message is sent using Ethernet-over-power.

15. A computer-implemented method for detecting if one or more processing devices have separately sourced power feeds, the method comprising:

capturing a first alternating current (AC) waveform from one or more portions of a first electric path;

capturing a second AC waveform from one or more portions of a second electric path, the second electric path different from the first electric path;

determining a phase difference between the first AC waveform and the second AC waveform; and determining, based on the phase difference, whether there is electrical isolation between the first electric path and the second electric path.

16. The method of claim 15, further comprising:

converting the first AC waveform into a first square wave; and converting the second AC waveform into a second square wave, wherein the determining the phase difference between the first AC waveform and the second AC waveform comprises comparing the first square wave to the second square wave.

17. The method of claim 16, wherein the comparing the first square wave to the second square wave comprises inputting the first square wave and the second square wave into an XOR gate.

\* \* \* \* \*